US010712015B2

(12) United States Patent
Bryant et al.

(10) Patent No.: US 10,712,015 B2
(45) Date of Patent: Jul. 14, 2020

(54) GROMMET FOR COOK TOP

(71) Applicants: BSH Home Appliances Corporation, Irvine, CA (US); BSH Hausgeräte GmbH, Munich (DE)

(72) Inventors: Drummond Bryant, New Bern, NC (US); Michael Petrino, Rockport, MA (US)

(73) Assignees: BSH Home Appliances Corporation, Irvine, CA (US); BSH Hausgeräte, Munich (DE)

( * ) Notice: Subject to any disclaimer, the term of this patent is extended or adjusted under 35 U.S.C. 154(b) by 169 days.

(21) Appl. No.: 15/969,801

(22) Filed: May 3, 2018

(65) Prior Publication Data
US 2019/0338955 A1 Nov. 7, 2019

(51) Int. Cl.
*F24C 3/12* (2006.01)
*F16J 15/54* (2006.01)

(52) U.S. Cl.
CPC .............. *F24C 3/126* (2013.01); *F16J 15/54* (2013.01)

(58) Field of Classification Search
CPC .. F24C 3/126; F24C 7/08; F24C 7/081; F24C 7/082; F24C 7/083; F24C 7/085; F16J 15/54; G05G 25/04; Y10T 16/063
See application file for complete search history.

(56) References Cited

U.S. PATENT DOCUMENTS

| 3,059,632 | A | * | 10/1962 | Rogers | F24C 15/12 126/37 R |
|---|---|---|---|---|---|
| 4,082,301 | A | | 4/1978 | Salinger | |
| 4,675,937 | A | | 6/1987 | Mitomi | |
| 7,992,876 | B2 | | 8/2011 | Akturk et al. | |
| 2014/0204557 | A1 | * | 7/2014 | Cadima | F21V 33/0044 362/23.07 |

FOREIGN PATENT DOCUMENTS

| EP | 2023358 A1 | 2/2009 |
| EP | 2877784 B1 | 4/2017 |
| ES | 2569424 A1 | 5/2016 |
| WO | 2014155269 A1 | 10/2014 |
| WO | 2017026960 A1 | 2/2017 |

* cited by examiner

Primary Examiner — Alfred Basichas
(74) Attorney, Agent, or Firm — Michael E. Tschupp; Andre Pallapies; Brandon G. Braun

(57) ABSTRACT

A grommet is provided for use with a gas valve assembly on a domestic kitchen appliance. The grommet has a collar portion configured to contact a shaft of a gas valve around a complete circumference of the shaft; an upper maintop contacting portion; a lower maintop contacting portion; and a central portion extending between the collar portion and the upper maintop contacting portion and having an inner diameter that increases with distance from the collar portion, the central portion having an inner surface configured to face the shaft. An air space is created in a radial direction between opposite sides of the inner surface of the central portion, the central portion being configured such that the air space exists between the inner surface of the central portion and the shaft in a radial direction, the radial direction being perpendicular to the axial direction.

20 Claims, 11 Drawing Sheets

GROMMET FOR COOK TOP

FIELD

The present invention relates generally to cook tops that have control knob shafts that extend through holes in a maintop. More specifically, particular embodiments of the invention relate to a grommet that prevents hot air from transferring heat to a control knob.

BACKGROUND

There are many cooking appliances in homes today, such as slide in ranges, free standing ranges, and other appliances, that have cook tops. Many of these cooking appliances have holes in the maintop of the cook top through which shafts extend. These shafts can be, for example, shafts of gas valves on which control knobs are mounted. Some of these cook tops develop a combustion air airflow that flows past the control knobs and, in doing so, creates a negative air pressure around and below the control knobs. This negative air pressure can cause hot air that exists below the maintop to be pulled up through the holes in the maintop. As the hot air is pulled up through the holes, it can pass over the control knobs and undesirably raise the temperature of the control knobs.

Accordingly, an improved system is desired for effectively preventing the passage of hot air from below the maintop through the holes in the maintop.

SUMMARY

A grommet in accordance with embodiments of the invention prevents hot air from passing through a hole in the cook top.

In one aspect, a grommet is for use with a gas valve assembly on a domestic kitchen appliance that burns gas to heat a food item, the domestic kitchen appliance having a maintop that separates a burner of the domestic kitchen appliance from an area below the maintop, the gas valve assembly having a gas valve for regulating a flow of the gas to a burner of the domestic kitchen appliance; a shaft extending from the gas valve and configured to extend through a hole in the maintop, a central axis of the shaft extending in an axial direction; and a control knob mounted to an end of the shaft. The grommet has a collar portion configured to contact the shaft around a complete circumference of the shaft, the collar portion having an inner diameter; an upper maintop contacting portion configured to contact an upper surface of the maintop; a lower maintop contacting portion configured to contact a lower surface of the maintop; and a central portion extending between the collar portion and the upper maintop contacting portion and having an inner diameter that increases with distance from the collar portion, the central portion having an inner surface configured to face the shaft. An air space is created in a radial direction between opposite sides of the inner surface of the central portion, the central portion being configured such that the air space exists between the inner surface of the central portion and the shaft in a radial direction, the radial direction being perpendicular to the axial direction.

In some embodiments, the central portion extends in the axial direction at least 50% of a total length of the grommet in the axial direction.

In some embodiments, the central portion extends in the axial direction at least 75% of a total length of the grommet in the axial direction.

In some embodiments, the central portion is open at its end adjacent to the upper maintop contacting portion.

In some embodiments, the collar portion is configured to create a seal around the shaft that is substantially air tight.

In some embodiments, the lower main top contacting portion comprises a plurality of tabs that extend from an outer surface of the central portion in the radial direction.

In some embodiments, the lower main top contacting portion comprises four of the tabs.

In some embodiments, a shoulder portion extends between the collar portion and the central portion.

In some embodiments, the central portion is open at its end adjacent to the upper maintop contacting portion.

In one aspect, a grommet is for use with a gas valve assembly on a domestic kitchen appliance that burns gas to heat a food item, the domestic kitchen appliance having a maintop that separates a burner of the domestic kitchen appliance from an area below the maintop, the gas valve assembly having a gas valve for regulating a flow of the gas to a burner of the domestic kitchen appliance; a shaft extending from the gas valve and configured to extend through a hole in the maintop, a central axis of the shaft extending in an axial direction; and a control knob mounted to an end of the shaft. The grommet has a collar portion configured to contact the shaft around a complete circumference of the shaft, the collar portion having an inner diameter; an upper maintop contacting portion configured to contact an upper surface of the maintop; a lower maintop contacting portion configured to contact a lower surface of the maintop; and a central portion extending between the collar portion and the upper maintop contacting portion and having an inner diameter that is larger than the inner diameter of the collar portion, the central portion having an inner surface configured to face the shaft. An air space is created in a radial direction between opposite sides of the inner surface of the central portion, the central portion being configured such that the air space exists between the inner surface of the central portion and the shaft in a radial direction, the radial direction being perpendicular to the axial direction.

In one aspect, a domestic kitchen appliance burns gas to heat a food item, the domestic kitchen appliance includes a burner that burns the gas; a maintop that separates the burner from an area below the maintop; a gas valve assembly that regulates a flow of the gas to the burner, the gas valve assembly having a shaft extending from the gas valve and through a hole in the maintop, a central axis of the shaft extending in an axial direction; a control knob mounted to an end of the shaft; and a grommet. The grommet has a collar portion that contacts the shaft around a complete circumference of the shaft, an upper main top contacting portion that contacts an upper surface of the maintop, a lower main top contacting portion that contacts a lower surface of the maintop, and a central portion extending between the collar portion and the upper maintop contact portion, the central portion having an inner surface that faces the shaft. An air space exists between the inner surface of the central portion and the shaft in a radial direction, the radial direction being perpendicular to the axial direction.

In some embodiments, the central portion is open at its end adjacent to the upper maintop contacting portion.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
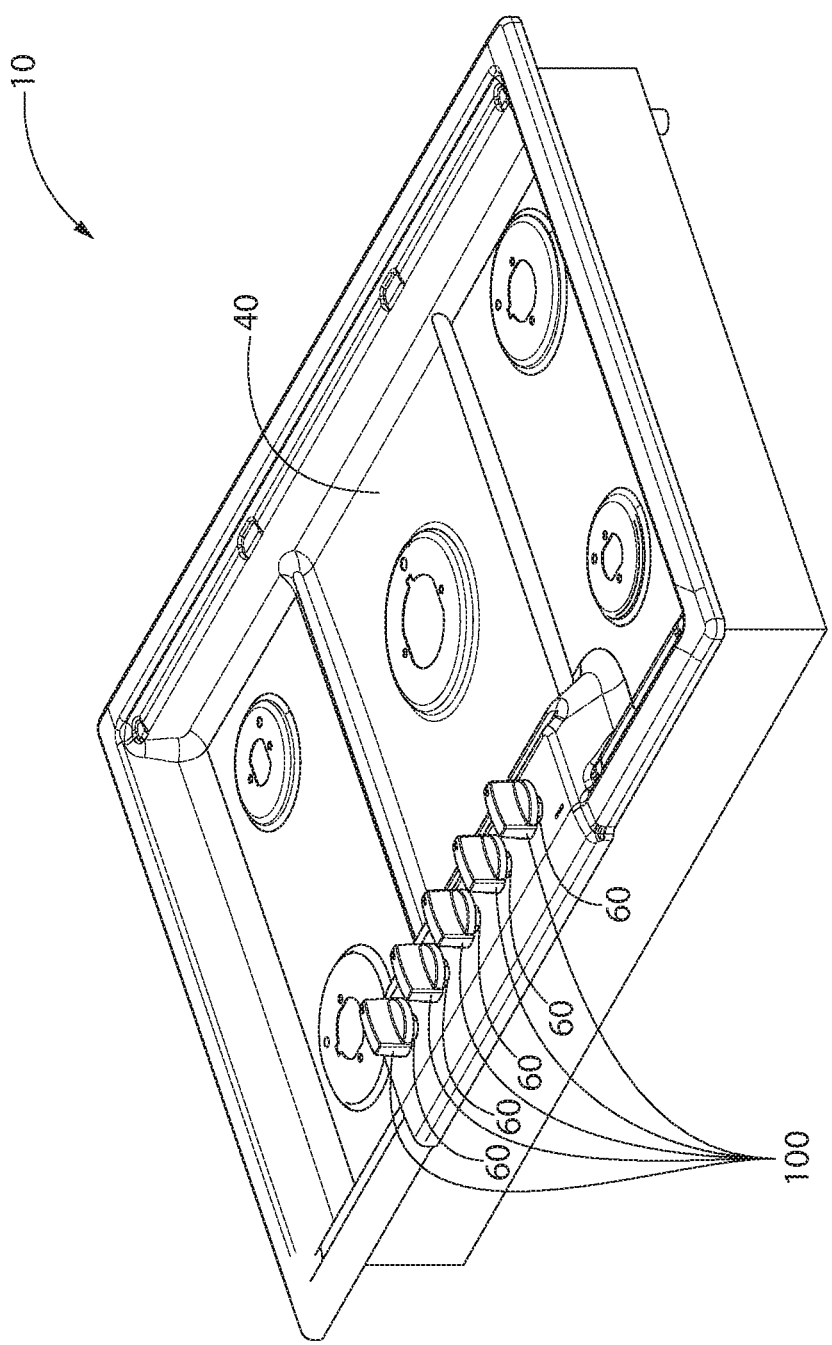
FIG. 1 is a perspective view of a cook top in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

As stated above, a grommet in accordance with embodiments of the invention prevents hot air from passing through a hole in the cook top.

FIG. 1 shows an example of a domestic kitchen appliance in accordance with embodiments of the invention. In this example, a cooktop 10 has a maintop 40 that is, for example, a porcelain sheet. In some embodiments, maintop 40 is stainless steel, painted steel, ceramic coated steel, some other metal, porcelain, a composite material, or plastic. In this example, cook top 10 has five gas burners 20 (shown in FIG. 2). Each burner 20 is provided gas for burning to generate heat for heating a food item. A separate gas control assembly 100 is provided to regulate the flow of gas to each burner 20. In this example, gas control assembly 100 has a portion that is located above maintop 40 and a portion that is located below maintop 40. Each control assembly passes through a hole 60 in maintop 40.

As discussed above, hot air can exist below maintop 40 as a result of burners 20 generating heat that is transferred to maintop 40 and/or heat generation from a cooking device (such as an oven) located below cook top 10. This phenomenon can be particularly noticeable with a porcelain main top because porcelain acts as an insulator and, as a result, holds more heat underneath the main top. In some situations, such as with top breathing burners, combustion air used by one or more of burners 20 can be drawn over maintop 40 from the perimeter of cook top 10. Some of this combustion air can be drawn from the front of cook top 10 near control assemblies 100. As the combustion air is drawn over holes 60, low pressure zones can be created above holes 60. These low pressure zones can cause the hot air that exists below maintop 40 to be drawn up through maintop 40 and into contact with control knobs 110 (FIG. 2), causing control knobs 110 to be heated. A control knob temperature above a particular level can be undesirable. In addition, CSA standards require a knob temperature under 55° C.

Figure 2:
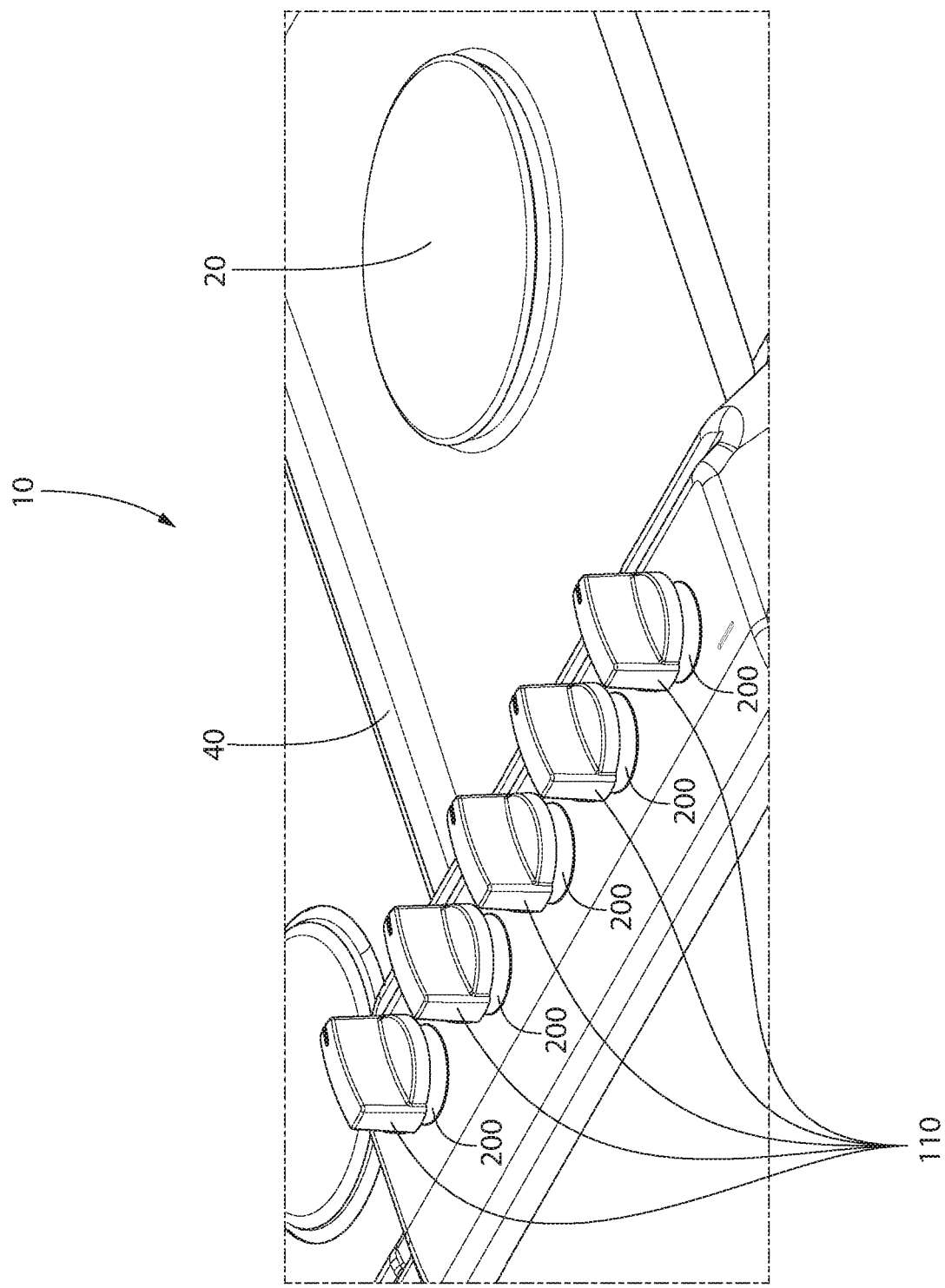
FIG. 2 is a partial perspective view of the cook top of FIG. 1.
Figure 3:
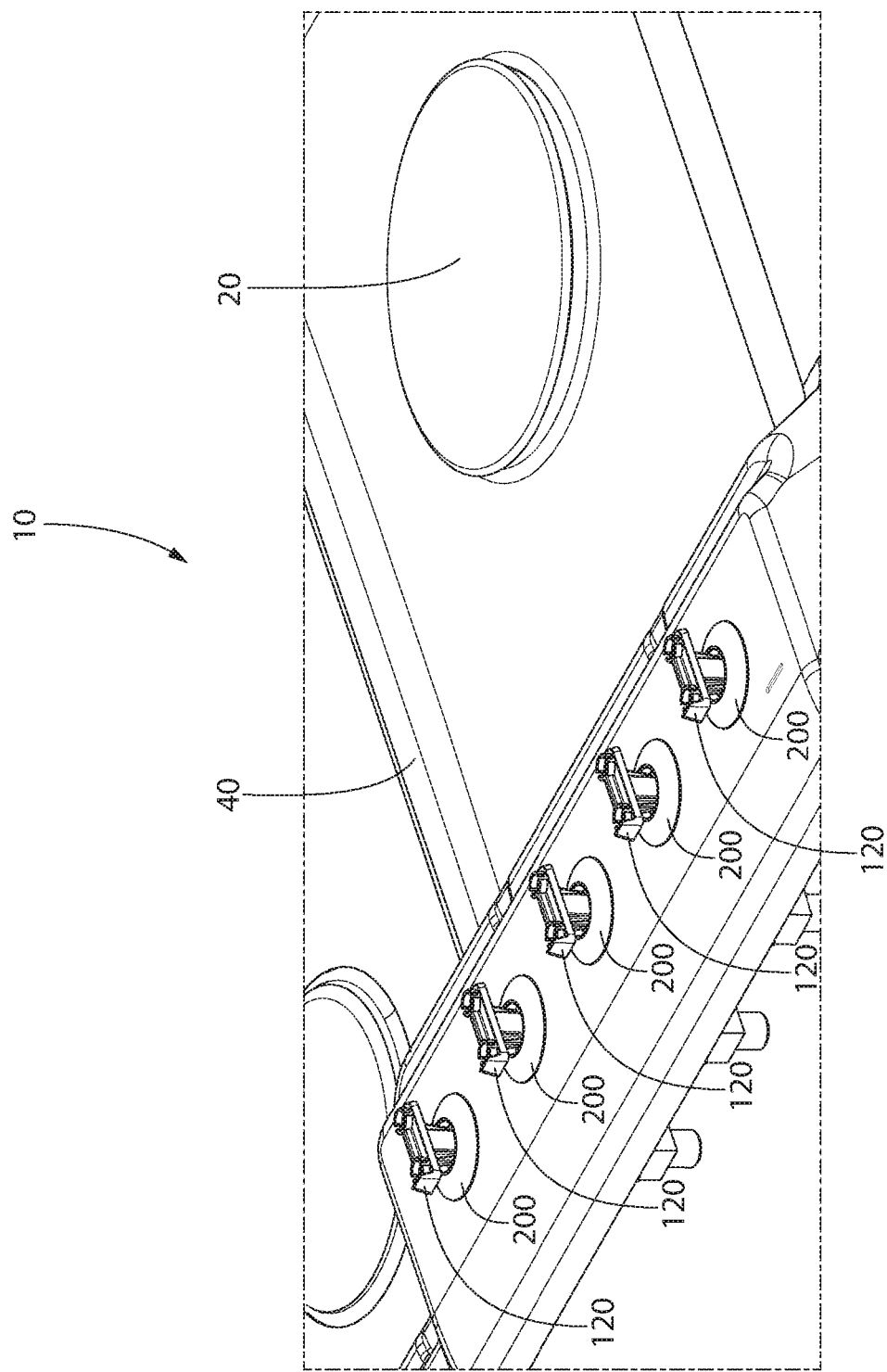
FIG. 3 is a partial perspective view of the cook top of FIG. 1 with the control knobs removed.

FIG. 2 shows cook top 10 with a grommet 200 in position in each hole 60 in maintop 40. Grommets 200 block air from passing from below maintop 40 to above maintop 40 by sealing off holes 60. FIG. 3 is similar to FIG. 2, but control knobs 110 have been removed to more clearly show grommets 200. In this embodiment, a control knob base 120 is attached to a shaft of a gas valve and control knob 110 is attached to control knob base 120. Control knob base 120 can be a friction fit, a threaded connection, or attached by any other appropriate connection to the shaft. Control knob 110 can be a friction fit, connected by threaded connectors, or attached by any other appropriate connection to control knob base 120.

Figure 4:
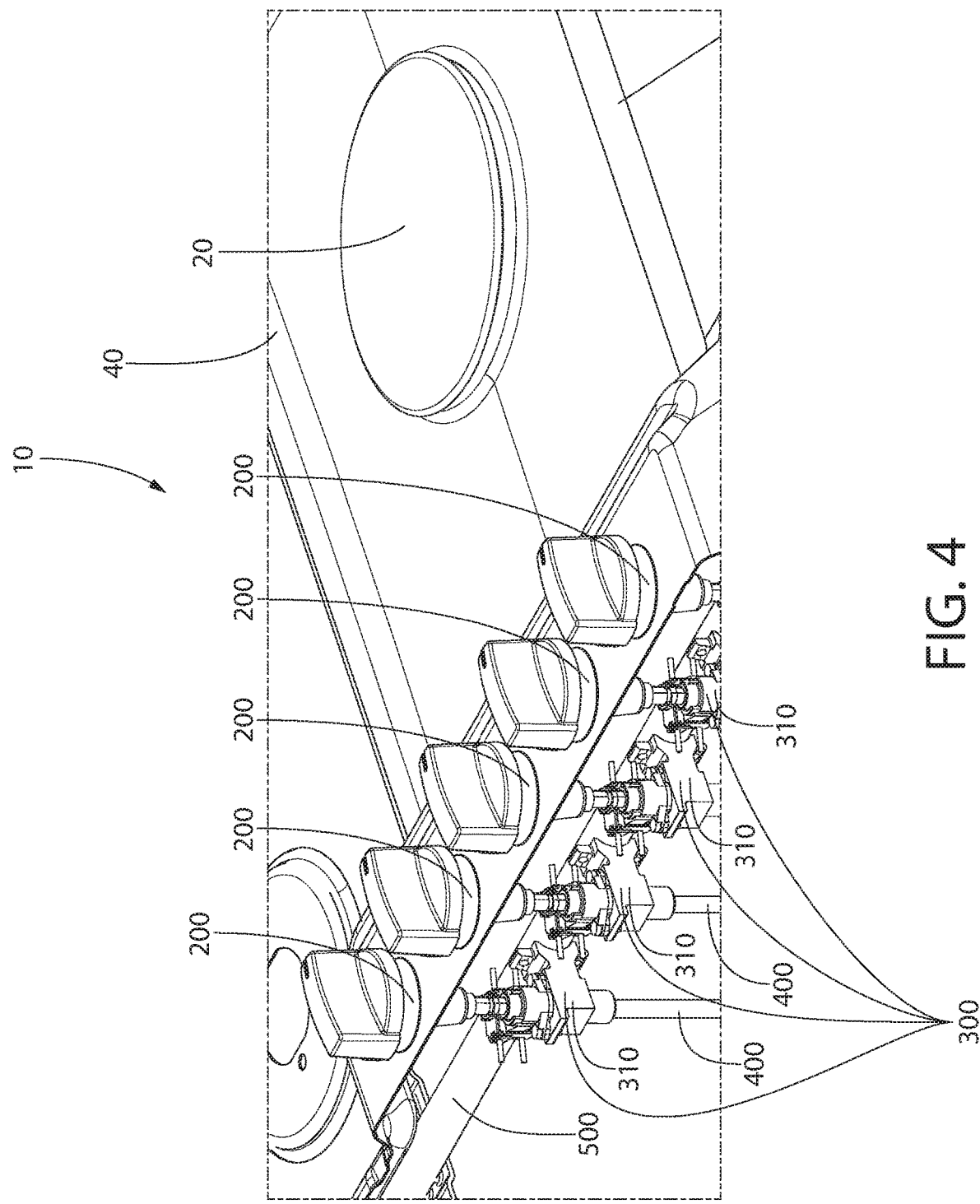
FIG. 4 is a partial perspective view of the cook top of FIG. 1 showing the gas valves.

FIG. 4 shows cook top 10 partially cut away to expose gas valve assemblies 300. Each gas valve assembly 300 is fluidly connected to a gas supply line 400 and receives gas from gas supply line 400. The gas flow to a particular burner 20 is regulated by a gas valve body 310 in accordance with the position of the associated control knob 110.

Figure 5:
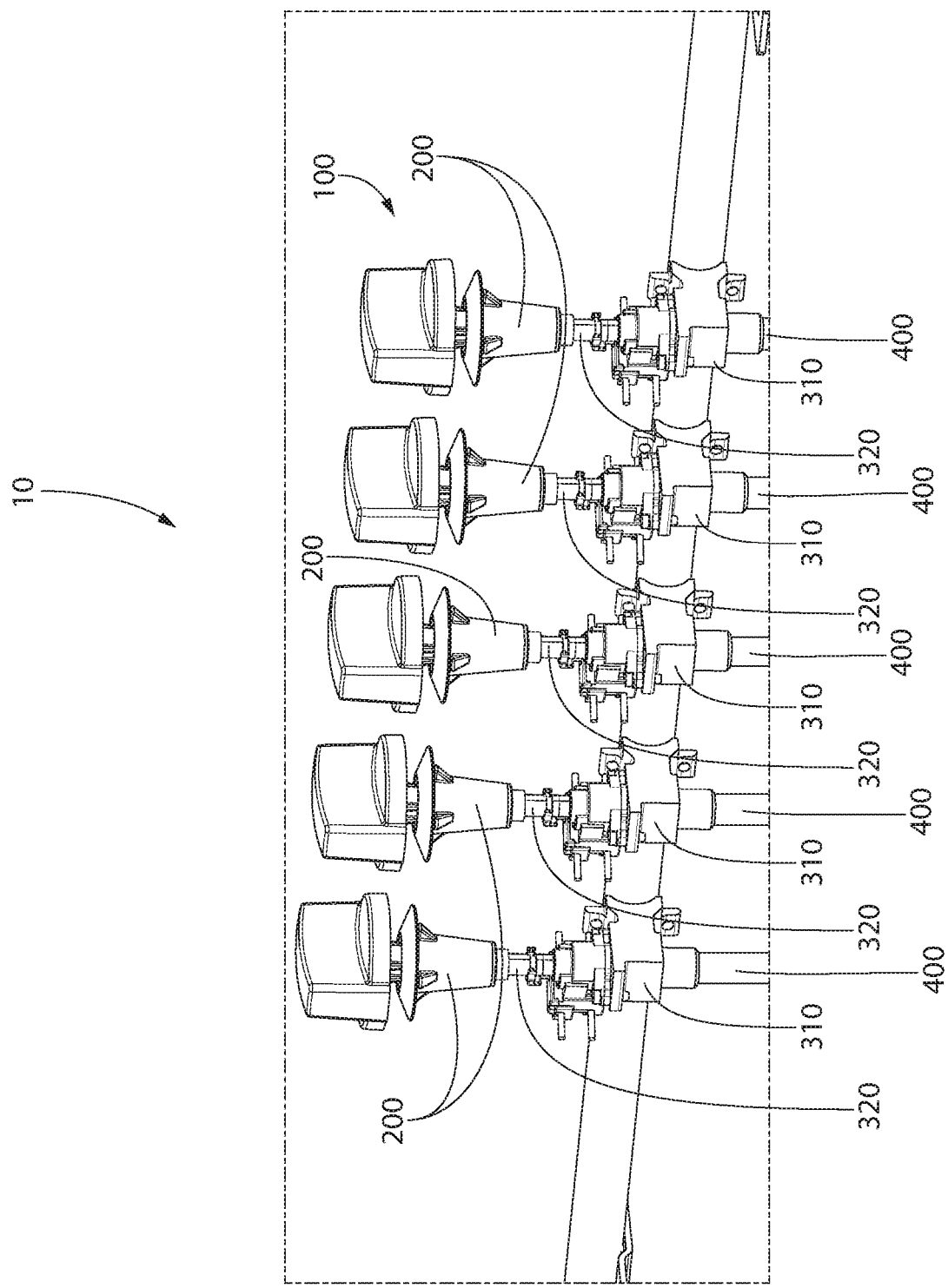
FIG. 5 is a partial perspective view of the cook top of FIG. 1 showing the gas valves.

FIG. 5 shows gas valve assemblies 300 with maintop 40 removed for clarity. Each gas valve assembly 300 has a housing 310 from which shaft 320 extends. This view shows more clearly grommets 200 mounted to shafts 320 of gas valve assemblies 300. The example shown in FIGS. 1-5 is just one example of a gas valve assembly to which grommet 200 can be applied. Other configurations of main tops and gas valve assemblies can also benefit from grommets in accordance with embodiments of the invention.

Figure 6:
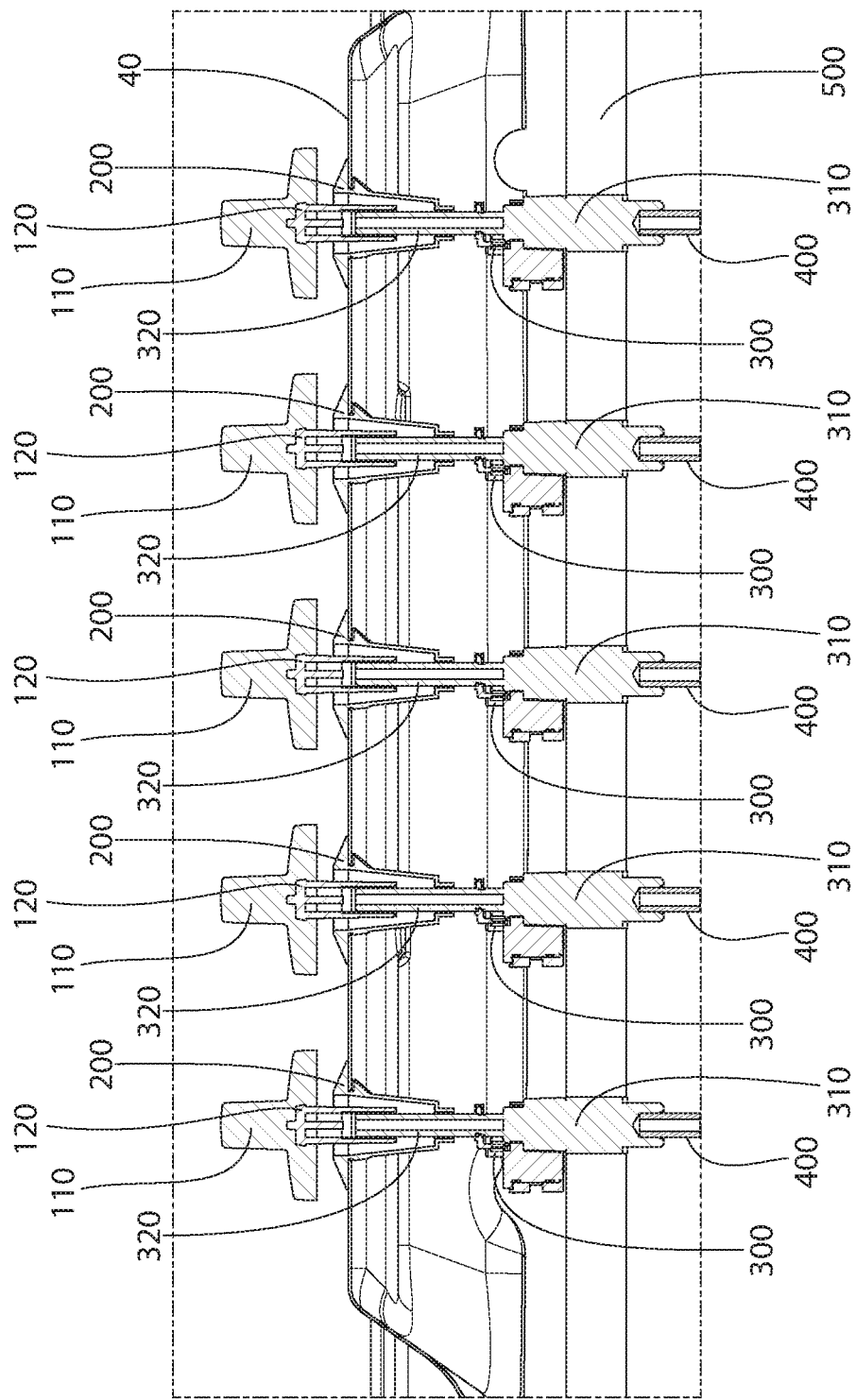
FIG. 6 is a partial front sectional view of the cook top of FIG. 1.

FIG. 6 shows the five control assemblies 100 in sectional view. This figure shows shaft 320 extending upward from housing 310 and having control knob base 120 mounted on the upper end of shaft 320. Control knob 110 is then attached to control knob base 120. FIG. 6 shows the five shafts 320 extending at a right angle to maintop 40, which is the ideal case. However, in some cases a misalignment can occur between shafts 320 and holes 60. This misalignment can cause shafts 320 to be off-center relative to holes 60 and/or a tilting of shaft 320 relative to vertical. Grommet 200 can maintain its seal on shaft 320 when such misalignment occurs (discussed further below).

Figure 7:
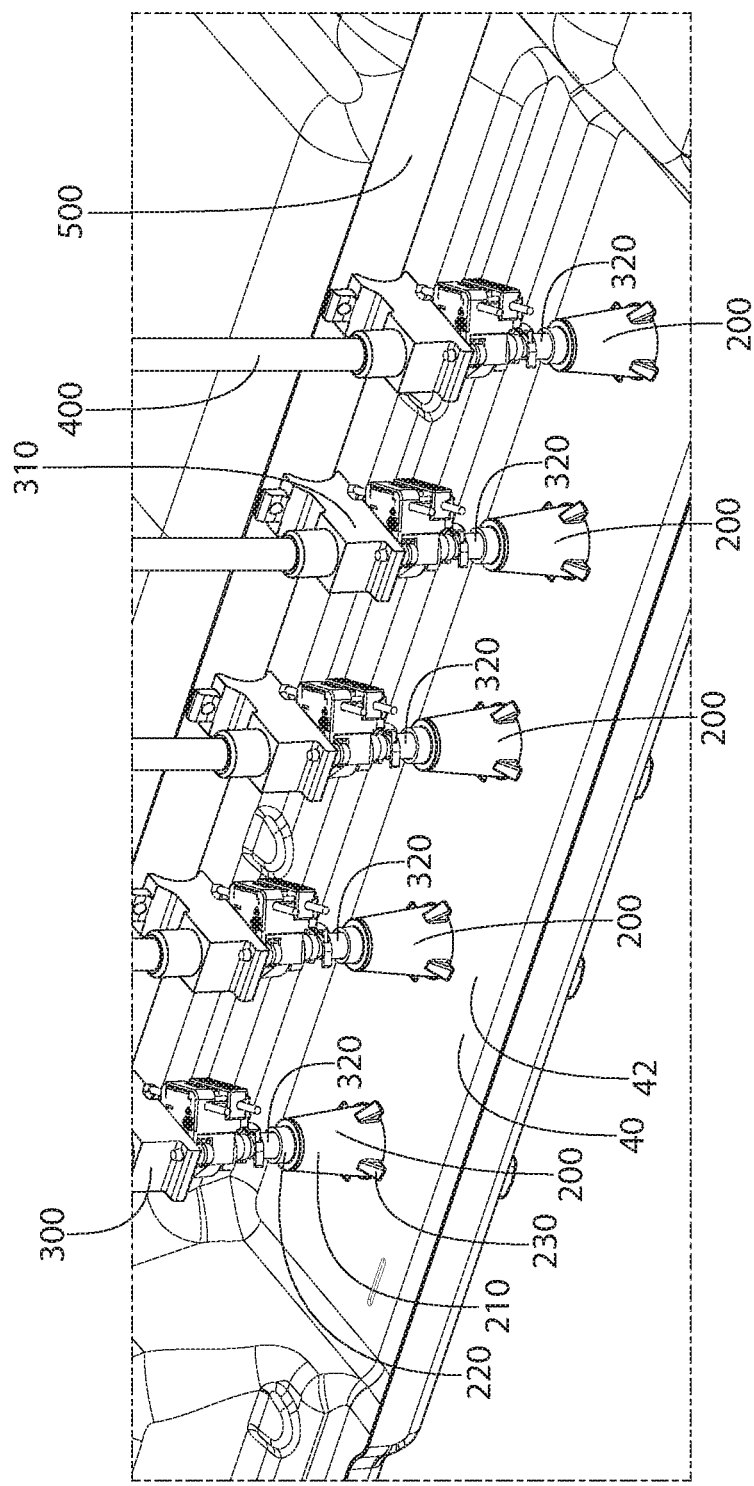
FIG. 7 is a partial bottom perspective view of the cook top of FIG. 1.

FIG. 7 shows cook top 10 from below. Maintop 40 has an underside 42. In this example, four lugs 230 of grommet 200 press against underside 42 of maintop top 40 to keep grommet 200 pressed against maintop 40. Other embodiments have fewer or more lugs 230 or have one lug that extends completely around grommet 200.

Figure 8:
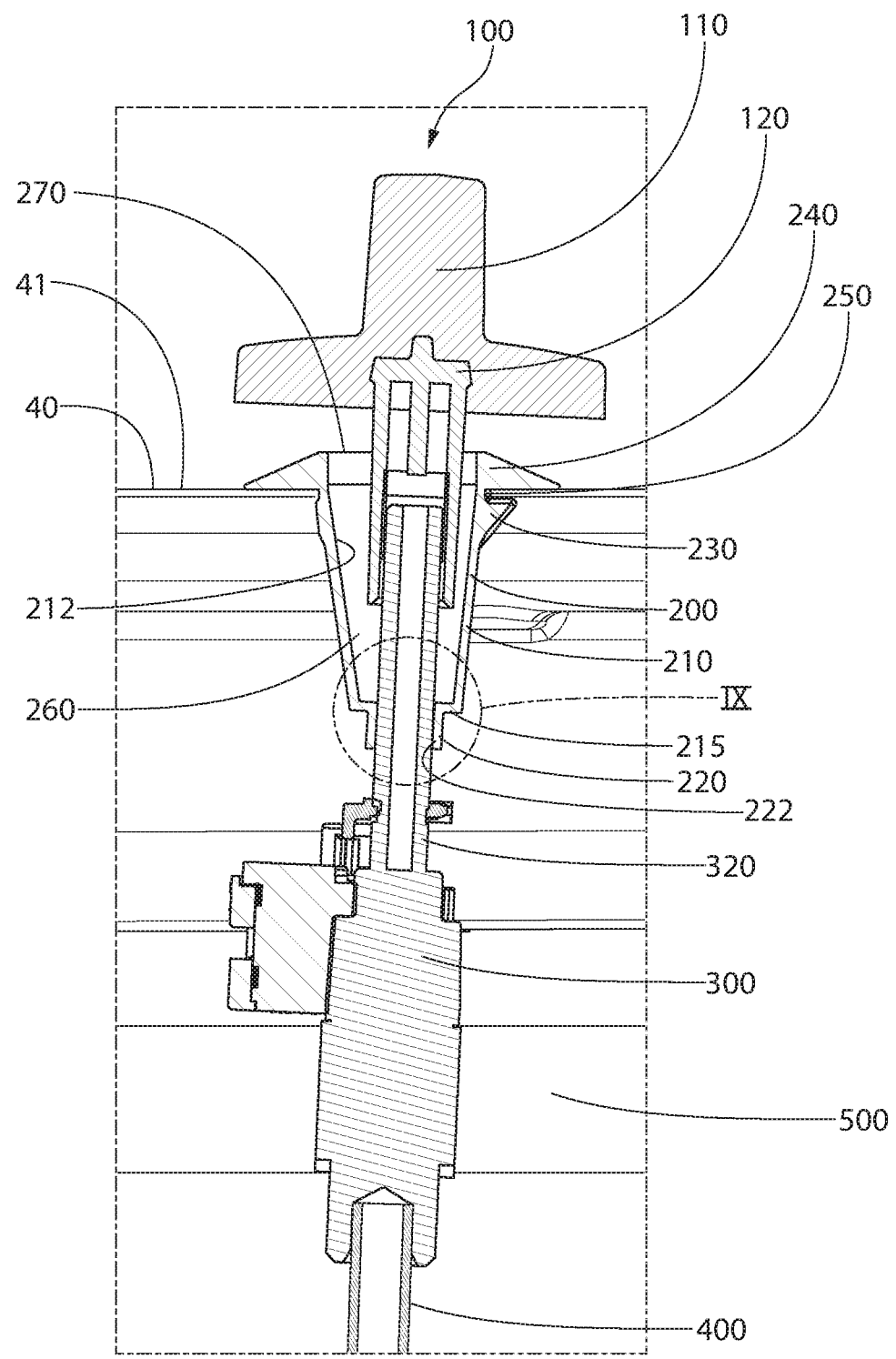
FIG. 8 is a sectional view of a grommet and gas valve in accordance with embodiments of the invention.

FIG. 8 shows control assembly 100 in more detail. Control assembly 100 extends along an axial direction that is shown as vertical in this figure. In this example, control knob base 120 is press-fit onto shaft 320 and control knob 110 snaps onto the top of control knob base 120. Other connections between shaft 320 and control knob base 120 can be used. Other connections between control knob base 120 and control knob 110 can also be used.

Grommet 200 has an upper maintop contacting portion 240 that extends radially relative to a central axis of grommet 200. Grommet 200 has an opening 270 located at upper maintop contacting portion 240. The size of opening 270 allows control assembly 100 to be misaligned somewhat without contacting grommet 200 (discussed further below). Upper maintop contacting portion 240 is larger in outside diameter than hole 60 in maintop 40 and provides a seal between grommet 200 and maintop 40. This seal can prevent or limit water or other material spilled on maintop 40 from entering hole 60. The seal can also prevent or limit hot air from passing through hole 60 from underneath maintop 40. In this example, upper maintop contacting portion 240 is round. In other examples, upper maintop contacting portion 240 is a different shape such as, for example, oval, square, rectangular, triangular, or any other shape. Grommet 200 has a lower maintop contacting portion 230 that extends radially relative to the central axis of grommet 200. Lower maintop contacting portion 230 comprises, in this case, four lugs that extend radially beyond hole 60 in maintop 40 and provide un upward force on the lower surface 42 of maintop 40. In this example, lower maintop contacting portion 230 is four lugs. In other examples, lower maintop contacting portion 230 is a different number of lugs or a different shape such as, for example, a complete circle, oval, square, rectangle, triangle, or any other shape. The upward force exerted by lower maintop contacting portion 230 maintains contact between a lower surface of upper maintop contacting portion 240 and the upper surface 41 of maintop 40. With grommet 200 installed, the edge of maintop 40 at hole 60 is located in a recess 250 between upper maintop contacting portion 240 and lower maintop contacting portion 230.

Grommet 200 has a collar portion 220 that forms a seal with the outside surface of shaft 320 by in inner surface 222 of collar portion 220 being pressed tightly against the outside surface of shaft 320. Grommet 200 has a central portion 210 that makes up a large portion of the length of grommet 200 in the axial direction. In some examples, central portion 210 is at least 50% of the total length of the grommet in the axial direction. In some examples, central portion 210 is at least 75% of the total length of the grommet in the axial direction. This relative length of central portion 210 facilitates flexing of central portion 210, which helps maintain a good seal between inner surface 222 of collar portion 220 and shaft 320 by reducing the stress put on collar portion 220 in the case of a misalignment of control assembly 100. Also, the wall of central portion 210 can be thin and flexible to allow distortion of grommet 200 without adversely affecting the seal between collar portion 220 and shaft 320 or the seal with maintop 40 in notch 250.

A shoulder portion 215 extends, in this example, radially from an upper end of collar portion 220 and adjoins the lower end of central portion 210. Shoulder portion 215 further facilitates displacement of central portion 210, due to, for example, misalignment of control assembly 100, without adversely affecting the seal between collar portion 220 and shaft 320. Shoulder portion 215 is shown in this example extending at an angle of 90 degrees from collar portion 220 but can, in other examples, extend at an angle other than 90 degrees. In some examples, no shoulder portion 215 exists and central portion 210 adjoins directly to collar portion 220. In the case of no shoulder portion 215 existing, central portion 210 extends away from shaft 320 so that the inside wall of central portion 210 does not contact shaft 320.

Central portion 210 being spaced away from shaft 320 creates an air space 260 between the inner wall 212 of central portion 210 and the outside surface of shaft 320. Air space 260 permits control assembly 100 to be misaligned (as shown in FIG. 8) without shaft 320 or control knob base 120 contacting grommet 200 (other than at collar 220). Air space 260 also provides a thermally insulating gap between hot air that might exists in the space below maintop 40 and control knob base 120. This insulating gap can help maintain a lower temperature of control knob base 120 and control knob 110.

The flexible nature of some embodiments of grommet 200 allows grommet 200 to be easily removed from maintop 40 for cleaning. To remove grommet 200, control knob 110 and control knob 120 are removed from shaft 320. Grommet 200 can then be pulled upward, disengaging lower maintop contacting portion 230 from maintop 40, and off or the end of shaft 320. Grommet 200 can then be hand washed or washed in a dishwasher. After cleaning, grommet 200 is simply pushed back onto shaft 320 and into hole 60 until lower maintop contacting portion 230 reengages the lower surface 42 of main top 40.

Figure 9:
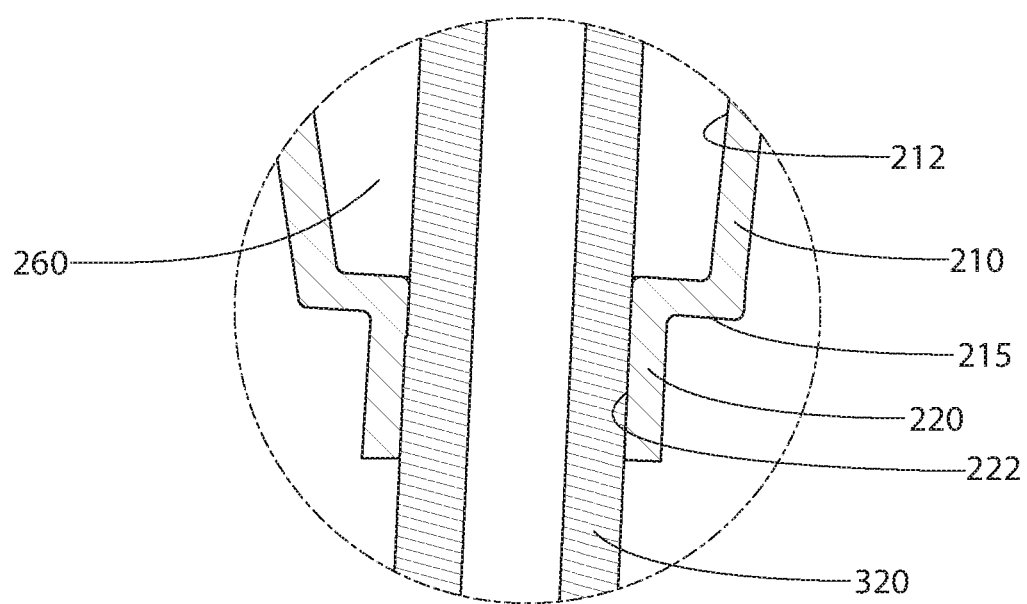
FIG. 9 is a detail of FIG. 8.
Figure 10:
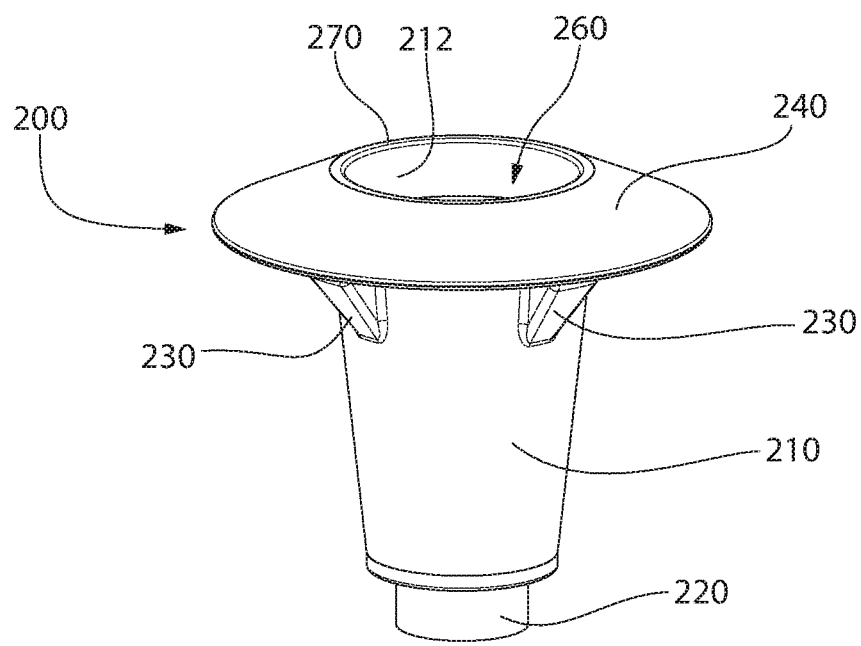
FIG. 10 is a perspective view of a grommet in accordance with embodiments of the invention.
Figure 11:
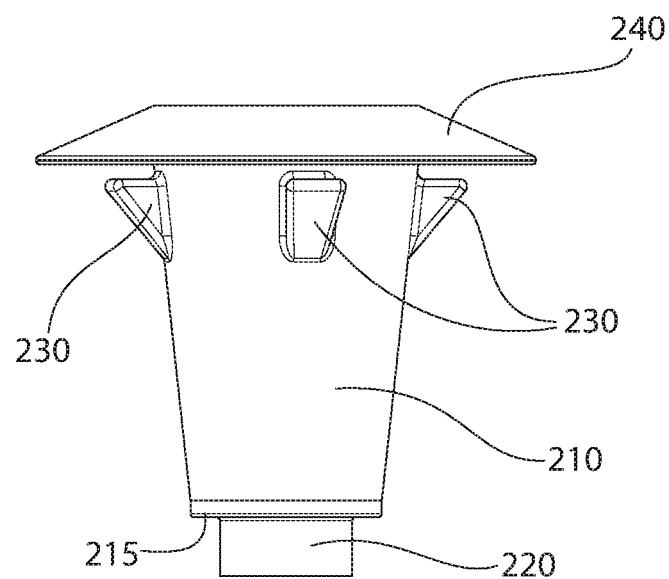
FIG. 11 is a front view of the grommet shown in FIG. 10.
Figure 12:
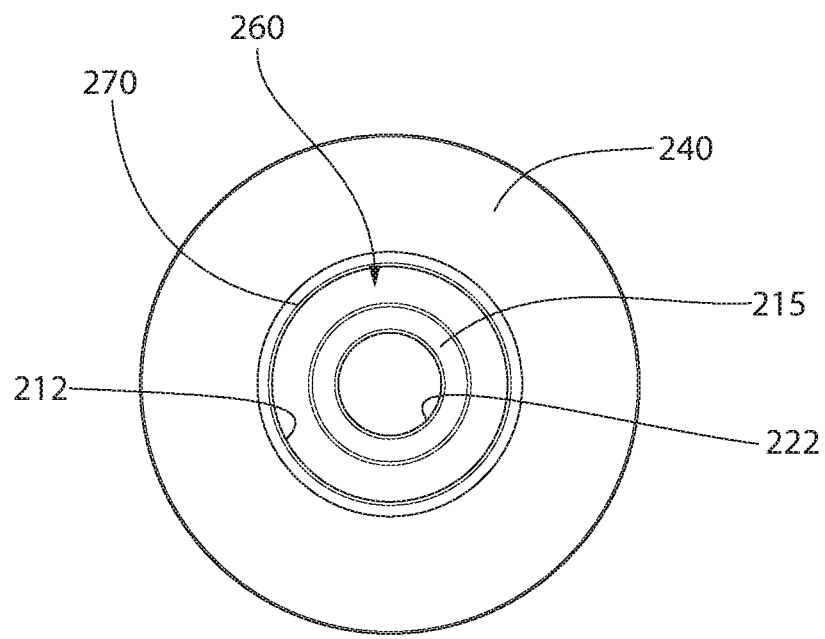
FIG. 12 is a top view of the grommet shown in FIG. 10.
Figure 13:
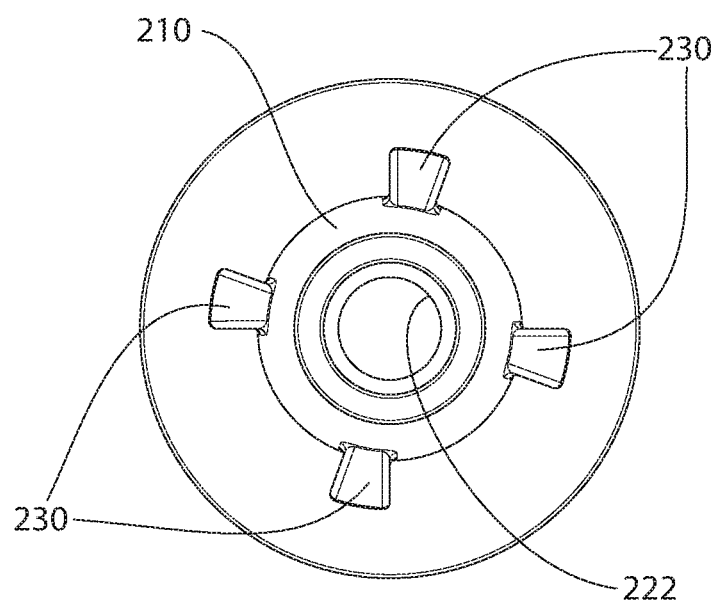
FIG. 13 is a bottom view of the grommet shown in FIG. 10.

FIG. 9 shows the interaction between the inner surface 222 of collar portion 220 and the outer surface of shaft 320. The contact between inner surface 222 of collar portion 220 and the outer surface of shaft 320 is maintained when shaft 320 is perpendicular to main top 40 and when shaft 320 is skewed relative to maintop 40 (misaligned). The seal between collar portion 220 and shaft 320 prevents or reduces the passage of hot air from below maintop 40 to the location of control knob 110, thereby reducing the temperature of control knob 110. The vertical length (in the axial direction) of collar 220 can be different in different embodiments. Collar 220 can be made longer, either dimensionally or relative to the overall length of grommet 200, to create a more complete seal with shaft 320, but doing so can increase the force needed to remove grommet 200 from shaft 320.

FIGS. 10-13 show an example of grommet 200. In this example, lower maintop contacting portion 230 comprises four lugs. In other embodiments, such as that shown in FIG.

8, an odd number of lugs is used. Other than the number of lugs used, the example of grommet 200 shown in FIGS. 10-13 is identical to the example shown in FIGS. 2-9.

Grommet 200 can be a flexible material such as silicone rubber or other material that can maintain a seal between collar portion 220 and shaft 320 and can provide the flexibility desired as described above.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A grommet for use with a gas valve assembly on a domestic kitchen appliance that burns gas to heat a food item, the domestic kitchen appliance having a maintop that separates a burner of the domestic kitchen appliance from an area below the maintop, the gas valve assembly having a gas valve for regulating a flow of the gas to a burner of the domestic kitchen appliance; a shaft extending from the gas valve and configured to extend through a hole in the maintop, a central axis of the shaft extending in an axial direction; and a control knob mounted to an end of the shaft, the grommet comprising:
    a single-walled collar portion configured to contact the shaft around a complete circumference of the shaft, the collar portion having an inner diameter;
    an upper maintop contacting portion configured to contact an upper surface of the maintop;
    a lower maintop contacting portion configured to contact a lower surface of the maintop; and
    a single-walled central portion, the single-walled central portion extending from the single-walled collar portion and connecting to the upper maintop contacting portion and having an inner diameter that increases with distance from the collar portion, the central portion having an inner surface configured to face the shaft,
        wherein an air space is created in a radial direction between opposite sides of the inner surface of the central portion, the central portion being configured such that the air space exists between the inner surface of the central portion and the shaft in a radial direction, the radial direction being perpendicular to the axial direction.

2. The grommet of claim 1, wherein the single-walled central portion is open at its end adjacent to the upper maintop contacting portion.

3. The grommet of claim 1, wherein the single-walled central portion extends in the axial direction at least 50% of a total length of the grommet in the axial direction.

4. The grommet of claim 3, wherein the single-walled central portion extends in the axial direction at least 75% of a total length of the grommet in the axial direction.

5. The grommet of claim 3, wherein the single-walled central portion is open at its end adjacent to the upper maintop contacting portion.

6. The grommet of claim 5, wherein the collar portion is configured to create a seal around the shaft that is substantially air tight.

7. The grommet of claim 6, wherein the lower top sheet contacting portion comprises a plurality of tabs that extend from an outer surface of the single-walled central portion in the radial direction.

8. The grommet of claim 7, wherein the lower main top contacting portion comprises four of the tabs.

9. The grommet of claim 8, further comprising a shoulder portion that extends between the collar portion and the single-walled central portion.

10. A grommet for use with a gas valve assembly on a domestic kitchen appliance that burns gas to heat a food item, the domestic kitchen appliance having a maintop that separates a burner of the domestic kitchen appliance from an area below the maintop, the gas valve assembly having a gas valve for regulating a flow of the gas to a burner of the domestic kitchen appliance; a shaft extending from the gas valve and configured to extend through a hole in the maintop, a central axis of the shaft extending in an axial direction; and a control knob mounted to an end of the shaft, the grommet comprising:
    a collar portion configured to contact the shaft around a complete circumference of the shaft, the collar portion having an inner diameter;
    an upper maintop contacting portion configured to contact an upper surface of the maintop;
    a lower maintop contacting portion configured to contact a lower surface of the maintop; and
    a single-walled central portion, the single-walled central portion extending from the collar portion and connecting to the upper maintop contacting portion and having an inner diameter that is larger than the inner diameter of the collar portion, the central portion having an inner surface configured to face the shaft,
        wherein an air space is created in a radial direction between opposite sides of the inner surface of the central portion, the central portion being configured such that the air space exists between the inner surface of the central portion and the shaft in a radial direction, the radial direction being perpendicular to the axial direction.

11. The grommet of claim 10, wherein the single-walled central portion is open at its end adjacent to the upper maintop contacting portion.

12. The grommet of claim 10, wherein the single-walled central portion extends in the axial direction at least 50% of a total length of the grommet in the axial direction.

13. The grommet of claim 12, wherein the single-walled central portion extends in the axial direction at least 75% of a total length of the grommet in the axial direction.

14. The grommet of claim 12, wherein the single-walled central portion is open at its end adjacent to the upper maintop contacting portion.

15. The grommet of claim 14, wherein the collar portion is configured to create a seal around the shaft that is substantially air tight.

16. The grommet of claim 15, wherein the lower top sheet contacting portion comprises a plurality of tabs that extend from an outer surface of the central portion in the radial direction.

17. The grommet of claim 16, wherein the lower main top contacting portion comprises four of the tabs.

18. The grommet of claim 17, further comprising a shoulder portion that extends between the collar portion and the single-walled central portion.

19. A domestic kitchen appliance that burns gas to heat a food item, the domestic kitchen appliance comprising:
  a burner that burns the gas;
  a maintop that separates the burner from an area below the maintop;
  a gas valve assembly that regulates a flow of the gas to the burner, the gas valve assembly having a shaft extending from the gas valve and through a hole in the maintop, a central axis of the shaft extending in an axial direction;
  a control knob mounted to an end of the shaft; and
  a grommet having
    a collar portion that contacts the shaft around a complete circumference of the shaft,
    an upper maintop contacting portion that contacts an upper surface of the maintop,
    a lower maintop contacting portion that contacts a lower surface of the maintop, and
    a single-walled central portion, the single-walled central portion extending from the collar portion and connecting to the upper maintop contact portion, the central portion having an inner surface that faces the shaft,
  wherein an air space exists between the inner surface of the central portion and the shaft in a radial direction, the radial direction being perpendicular to the axial direction.

20. The domestic kitchen appliance of claim 19, wherein the single-walled central portion is open at its end adjacent to the upper maintop contacting portion.

* * * * *